(12) United States Patent
Fukushi et al.

(10) Patent No.: US 8,894,080 B2
(45) Date of Patent: Nov. 25, 2014

(54) PRESS-FORMING METHOD OF TUBULAR PART HAVING CROSS SECTION OF IRREGULAR SHAPE, AND TUBULAR PART HAVING CROSS SECTION OF IRREGULAR SHAPE FORMED BY THE PRESS-FORMING METHOD

(75) Inventors: Takaaki Fukushi, Tokyo (JP); Isao Anai, Tokyo (JP); Yasushi Yamamoto, Tokyo (JP); Hideyuki Nakamura, Tokyo (JP); Yoshiaki Kadoma, Toyota (JP); Naoki Hori, Toyota (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 873 days.

(21) Appl. No.: 12/736,756

(22) PCT Filed: May 12, 2009

(86) PCT No.: PCT/JP2009/058832
§ 371 (c)(1),
(2), (4) Date: Feb. 10, 2011

(87) PCT Pub. No.: WO2009/139379
PCT Pub. Date: Nov. 19, 2009

(65) Prior Publication Data
US 2011/0121639 A1 May 26, 2011

(30) Foreign Application Priority Data
May 12, 2008 (JP) .................. 2008-124787

(51) Int. Cl.
*B60G 21/05* (2006.01)
*B60G 5/06* (2006.01)
*B60G 21/055* (2006.01)
*B60G 11/18* (2006.01)
*B21D 53/88* (2006.01)

(52) U.S. Cl.
CPC ...... *B60G 21/051* (2013.01); *B60G 2206/8102* (2013.01); *B60G 2200/21* (2013.01);
(Continued)

(58) Field of Classification Search
USPC .................... 280/124.166, 124.128, 124.149, 280/124.152, 124.116; 267/273, 283; 301/124.1, 133, 136; 29/897.2, 33 T, 29/283.5; 72/368, 367.1, 369
See application file for complete search history.

(56) References Cited

U.S. PATENT DOCUMENTS 3,705,604 A * 12/1972 Christin ........................ 138/178
5,520,407 A * 5/1996 Alatalo et al. ......... 280/124.166
(Continued)

FOREIGN PATENT DOCUMENTS

CN 1088143 6/1994
CN 1689723 11/2005
(Continued)

OTHER PUBLICATIONS

Chinese Office Action dated Apr. 12, 2013, issued in corresponding Chinese Application No. 200980111571.X, with English translation thereof.
(Continued)

*Primary Examiner* — Paul N Dickson
*Assistant Examiner* — George Spisich
(74) *Attorney, Agent, or Firm* — Kenyon & Kenyon LLP

(57) ABSTRACT

A method of press-forming a tubular part having a cross section of an irregular shape crushes a steel tube between an upper die and a lower die in order to form a V-shaped cross section. When the curvature radius of a tip of the upper die is defined as $R_1$, the curvature radius of a bottom portion of the lower die corresponding to the tip of the upper die is defined as $R_2$, and the wall thickness of the steel tube is defined as t; $R_1$, $R_2$, and t satisfy $R_1+2t=R_2$ and $1.5t \leq R_1 \leq 3t$.

3 Claims, 8 Drawing Sheets

(52) U.S. Cl.
CPC ..... *B60G 2206/724* (2013.01); *B60G 2206/203* (2013.01); *B21D 53/88* (2013.01); *B60G 2202/136* (2013.01); *B60G 2206/20* (2013.01); *B60G 2206/202* (2013.01)
USPC ...... 280/124.166; 280/124.116; 280/124.128; 29/897.2; 29/33 T; 29/283.5; 72/367.1; 267/273

(56) References Cited

U.S. PATENT DOCUMENTS

| | | | | |
|---|---|---|---|---|
| 6,119,501 | A | * | 9/2000 | Hansen et al. ............. 72/370.04 |
| 6,145,271 | A | * | 11/2000 | Kossmeier et al. ............. 52/843 |
| 6,487,886 | B2 | * | 12/2002 | Ueno et al. ........................ 72/57 |
| 6,523,841 | B2 | * | 2/2003 | Glaser et al. ........... 280/124.106 |
| 6,758,921 | B1 | * | 7/2004 | Streubel et al. .............. 148/593 |
| 8,308,175 | B2 | * | 11/2012 | Choi et al. ............. 280/124.106 |
| 2005/0035567 | A1 | * | 2/2005 | Ok et al. ................ 280/124.107 |
| 2006/0059974 | A1 | | 3/2006 | Park |
| 2009/0020974 | A1 | * | 1/2009 | Lee ........................ 280/124.107 |
| 2012/0104717 | A1 | * | 5/2012 | Hashimoto et al. .... 280/124.166 |

FOREIGN PATENT DOCUMENTS

| | | |
|---|---|---|
| CN | 101024236 | 8/2007 |
| DE | 19820415 | 9/1999 |
| JP | 08-206741 | 8/1996 |
| JP | 2001-321846 | 11/2001 |
| JP | 2005-306177 | 11/2005 |
| JP | 2006-89031 | 4/2006 |
| JP | 2007-76410 | 3/2007 |
| JP | 2007-237784 | 9/2007 |
| JP | 2008-030513 | 2/2008 |

OTHER PUBLICATIONS

Chinese Office Action dated Sep. 5, 2012 issued in corresponding Chinese Application No. 200980111571.X (with English Translation of Search Report).
International Search Report dated Jun. 9, 2009 issued in corresponding PCT Application No. PCT/JP2009/058832.
Korean Notice of Allowance, dated May 22, 2012, issued in corresponding Korean Application No. 10-2010-7021850, and an English translation thereof.

* cited by examiner

US 8,894,080 B2

PRESS-FORMING METHOD OF TUBULAR PART HAVING CROSS SECTION OF IRREGULAR SHAPE, AND TUBULAR PART HAVING CROSS SECTION OF IRREGULAR SHAPE FORMED BY THE PRESS-FORMING METHOD

BACKGROUND OF THE INVENTION

1. Field of the Invention

The present invention relates to: a press-forming method of a tubular part having a cross section of an irregular shape used for underbody parts, such as an axle beam; and a tubular part having a cross section of an irregular shape formed by this press-forming method, for a vehicle, such as an automobile or track.

This application is a national stage application of International Application No. PCT/JP2009/058832, filed May 12, 2009, which claims priority to Japanese Patent Application No. 2008-124787, filed on May 12, 2008, the content of which is incorporated herein by reference.

2. Description of Related Art

Tubular parts having a cross section of an irregular shape are conventionally and widely used as underbody parts for vehicles, such as axle beams disposed between the wheels of the vehicle and their surrounding suspension parts.

Since the tubular parts having the cross section of the irregular shape repeatedly takes an impact load, a torsional load, and the like while the vehicle is moving, high fatigue resistance is required in addition to high strength. These days, it is required that underbody parts for vehicles, such as axle beams, are not formed using a plurality of parts, but formed by press-working one steel tube.

An axle beam of a hollow structure formed into a cross section of an irregular shape by press-working of a high-strength steel tube is disclosed in the Japanese Unexamined Patent Application, First Publication No. 2001-321846.

However, in the axle beam of the Japanese Unexamined Patent Application, First Publication No. 2001-321846, heat treatment, such as quenching, is performed in order to control the residual stress in a stress concentration zone and to increase the fatigue resistance of the material. Moreover, an atmosphere control or descaling process is required to prevent oxidized scales formed by the heat treatment. As a result, there are problems in that not only the cost of the heat treatment but also the extra cost of coping with the above oxidized scales is incurred.

In addition, there are also problems in that the heat treatment deteriorates product precision and makes the attachment operation to the vehicle body difficult.

SUMMARY OF THE INVENTION

The invention was contrived in view of the above situation, and an object thereof is to provide a press-forming method of a tubular part having a cross section of an irregular shape which can improve fatigue resistance without heat treatment, such as quenching, (unlike the conventional techniques) which can reduce the cost and the number of processes, and which can secure product precision to improve attachability to a vehicle body when a tubular part having a cross section of an irregular shape, such as an axle beam, is manufactured by the press-forming of a steel tube, and to provide a tubular part having a cross section of an irregular shape formed by this press-forming method.

The invention has adopted the followings in order to solve the above-described problems and achieve the object.

(1) the present invention is a method of press-forming a tubular part having a cross section of an irregular shape which crushes a steel tube between an upper die and a lower die in order to form a V-shaped cross section. When the curvature radius of a tip of the upper die is defined as $R_1$, the curvature radius of a bottom portion of the lower die corresponding to the tip of the upper die is defined as $R_2$, and the wall thickness of the steel tube is defined as t; $R_1$, $R_2$, and t satisfy $R_1+2t=R_2$ and $1.5 \le R_1 \le 3t$.

(2) In a method of press-forming a tubular part having a cross section of an irregular shape described in the above (1), the method may include the steps of: performing pressing where a gap is provided between the tip of the upper die and the steel tube and between the bottom portion of the lower die and the steel tube before the upper die arrives at its bottom dead point position; performing pressing to form a tubular part having a cross section of an irregular shape so that the gap is completely crushed when the upper die arrives at the bottom dead point position; and giving compressive residual stress to a V-groove surface in the bottom portion of the tubular part having a cross section of an irregular shape by the spring-back which is caused in the tubular part having a cross section of an irregular shape after the upper and lower dies are opened.

(3) The present invention is a tubular part having a cross section of an irregular shape formed a V-shaped cross section manufactured by the method of press-forming a tubular part having a cross section of an irregular shape described in the above (2). The V-groove surface of the tubular part having a cross section of an irregular shape has the compressive residual stress formed by the spring-back.

(4) The tubular part having a cross section of an irregular shape described in the above (3) may be an underbody member used for a vehicle.

Since the upper and lower dies which satisfy $R_1+2t=R_2$ and $1.5t \le R_1 \le 3t$ are used in the press-forming method of tubular part having a cross section of an irregular shape described in the above (1), the residual stress of the tubular part having the cross section of the irregular shape can be controlled. Consequently, heat treatment, such as quenching, is not required after press-forming, unlike the related art, and compressive residual stress can be imparted to a predetermined position which is apt to sustain fatigue damage only during the pressing step, and thus a high fatigue resistance can be obtained.

Moreover, since the tubular part having the cross section of the irregular shape described in the above (3) has the compressive residual stress in the V-groove surface of the bottom portion of the part, a high fatigue resistance can be obtained and the product life of the part can be lengthened.

In particular, if the tubular part having the cross section of the irregular shape of the above (3) is used as an underbody part for a vehicle, it is possible to realize a low cost vehicle with a longer product life.

DETAILED DESCRIPTION OF THE INVENTION

Hereinafter, preferred embodiment of the present invention will be described with reference to the accompanying drawings.

Figure 1:
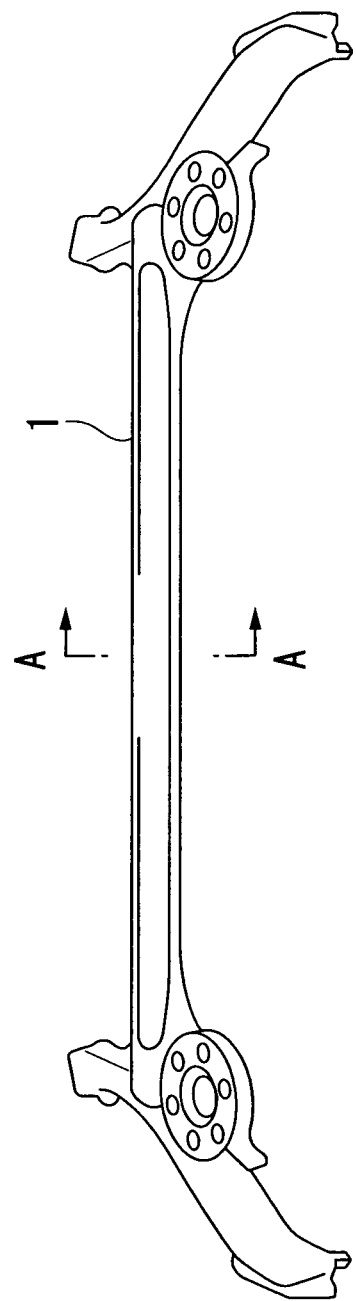
FIG. 1 is a perspective view showing an axle beam according to an embodiment of the present invention.

FIG. 1 shows an axle beam 1 which is one embodiment of a tubular part having a cross section of an irregular shape formed by a method of press-forming the tubular part having a cross section of an irregular shape of the present invention. Additionally, FIG. 2 shows a cross-sectional view taken along the line A-A of FIG. 1.

Figure 2:
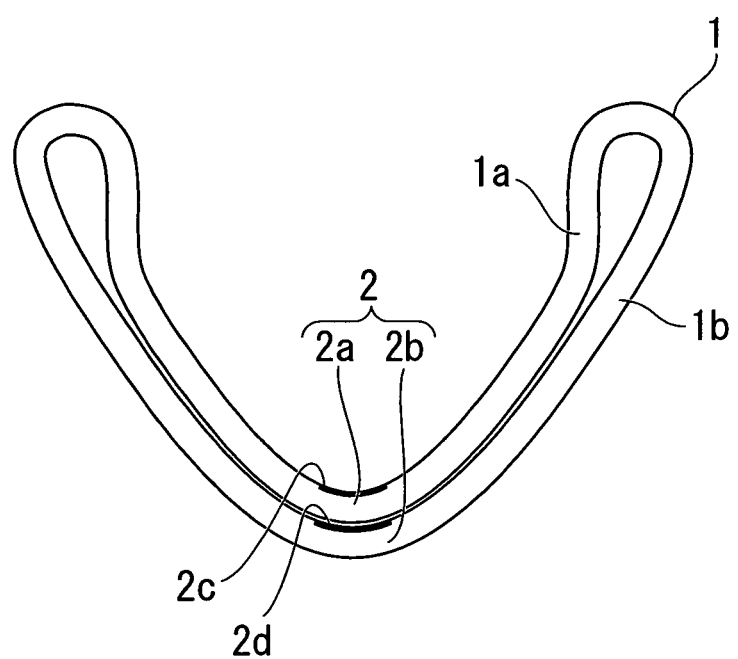
FIG. 2 is a cross-sectional view taken along the line A-A of FIG. 1.

As shown in FIG. 2, the axle beam 1 is obtained by crushing one steel tube between a pair of upper and lower dies (which will be described later) to press-form a steel tube with a V-shaped cross-section. Reference numeral 1a represents an upper plate corresponding to an upper arc in the cross-sectional shape of a steel tube before processing as the axle beam 1, and reference numeral 1b represents a lower plate corresponding to a lower arc in this cross-sectional shape. Moreover, reference numerals 2a and 2b respectively represent the bottom portions of the upper plates 1a and 1b, and reference numerals 2c and 2d respectively represent the V-groove surfaces of the bottom portions 2a and 2b.

In the axle beam 1, the stress generated during a fatigue test becomes the highest at the V-groove surface 2c of the bottom portion 2a of the upper plate 1a. Therefore, the V-groove surface 2c of the bottom portion 2a of the upper plate 1a is required to have compressive residual stress. Accordingly, in this embodiment, the compressive residual stress is imparted to the V-groove surface 2c of the bottom portion 2a of the member, thereby improving fatigue resistance.

In this embodiment, when the press-forming method of crushing a steel tube between a pair of upper and lower dies in order to manufacture a tubular part having a cross section of an irregular shape formed a V-shaped cross-section is performed and when the curvature radius of the tip of the upper die is defined as $R_1$ (mm), the curvature radius of the bottom portion of the lower die corresponding to the tip of the upper die is defined as $R_2$ (mm), and the plate thickness of the steel tube is defined as t (mm), the steel tube is press-formed so that $R_1$, $R_2$, and t satisfy the following Formulas (1) and (2).

$$R_1 + 2t = R_2 \quad (1)$$

$$1.5t \leq R_1 \leq 3t \quad (2)$$

In this embodiment, the press-working conditions for making the residual stress of the V-groove surfaces 2c and 2d of the bottom portion 2 of the axle beam 1 after spring-back into compressive stress (i.e., for forming compressive residual stress in the V-groove surfaces 2c and 2d of the bottom portion 2 by spring-back) are specified.

The above Formula (1) is a condition required in order to eliminate the gap between the upper die (which will be described later) and an article to be formed when the die arrives at a bottom dead point position. Additionally, as will be described below, $R_1 \leq 3t$ is required in order to leave a gap between the die and the given position of a steel tube which is an article to be formed before the upper die arrives at a bottom dead point position. On the other hand, is required in order to prevent cracks from initiating during press-forming. For these reasons, it is necessary to satisfy the condition of Formula (2).

The press-forming process of the present invention will be described below.

Figure 3:
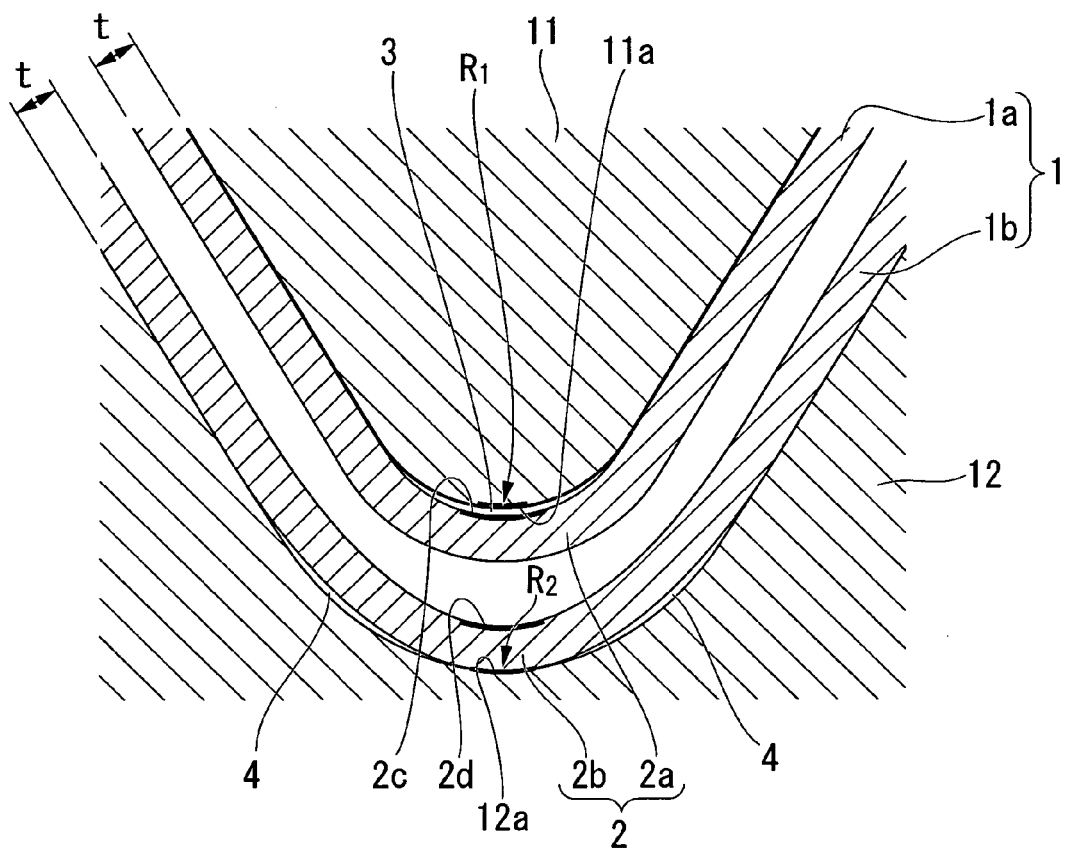
FIG. 3 is a cross-sectional view showing a state before the upper die arrives at its bottom dead point in the pressing process.
Figure 4:
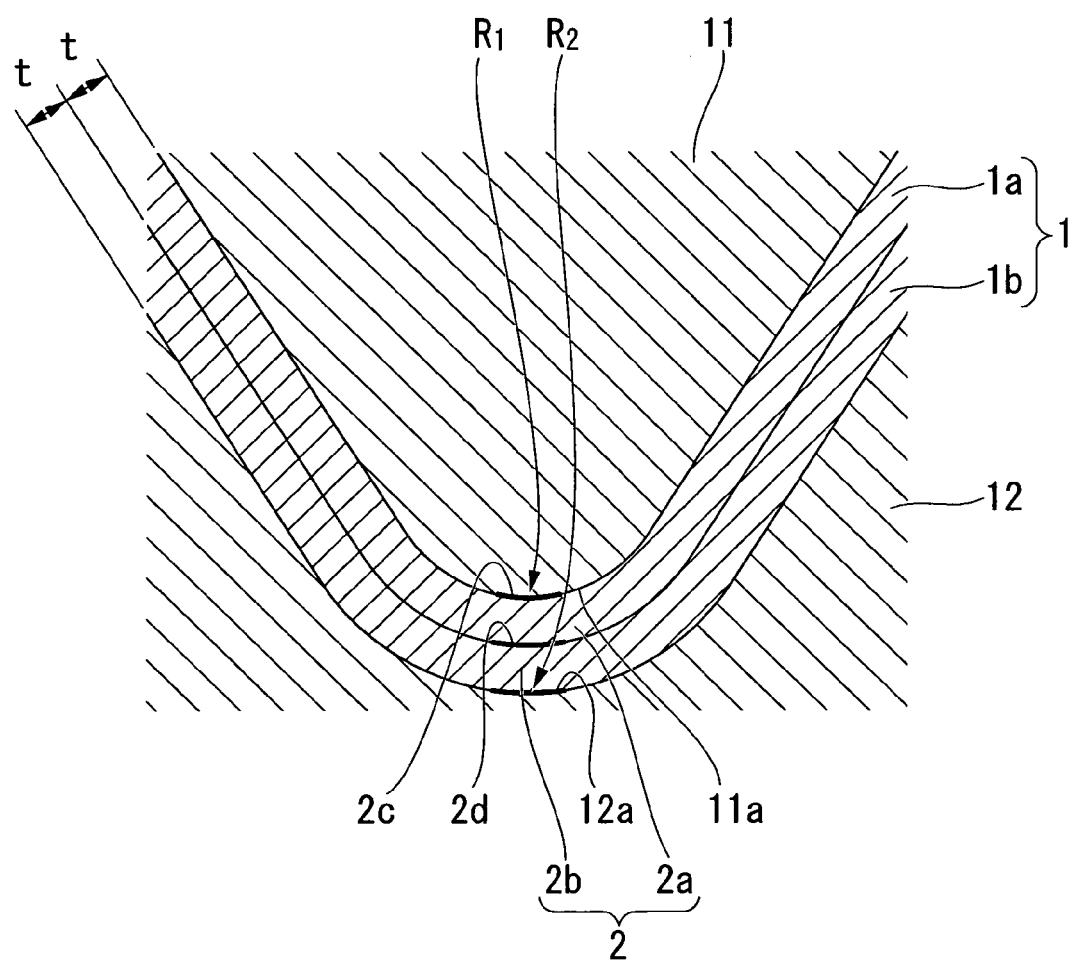
FIG. 4 is a cross-sectional view showing a state when the upper die has arrived at its bottom dead point position in the pressing process.
Figure 5:
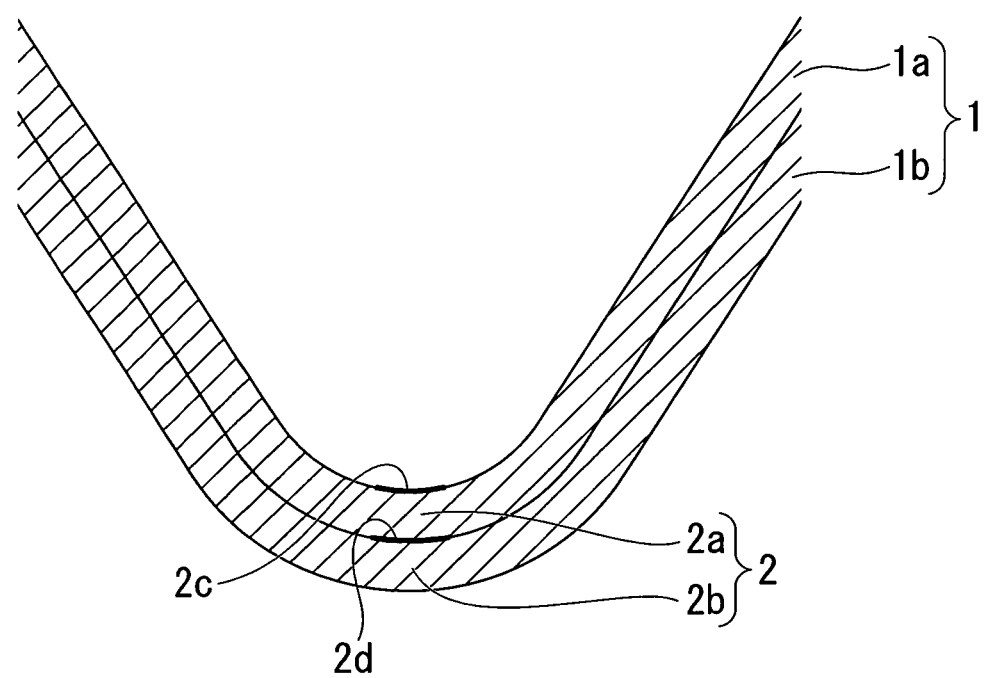
FIG. 5 is a cross-sectional view showing the bottom portion of the axle beam after press-forming.

All of FIGS. 3 to 5 are cross-sectional views of the press-forming process in the bottom portion 2 of the axle beam 1. FIGS. 3 to 5 are respectively an enlarged cross-sectional view of the press-forming process before the upper die arrives at its bottom dead point position, an enlarged cross-sectional view of the press-forming process when the upper die has arrived at its bottom dead point position, and an enlarged cross-sectional view of the bottom portion 2 of the axle beam 1 after the upper and lower dies are opened.

In addition, in FIGS. 3 to 5, reference numeral 11 represents an upper die and reference numeral 12 represents a lower die. When the steel tube which is the base material is press-formed between the upper die 11 and the lower die 12, the upper plate 1a and the lower plate 1b are brought into close contact with each other between the dies.

This embodiment is similar to the conventional technique in that the steel tube which is an article to be formed is set on the lower die 12, and the upper die 11 is lowered to crush the steel tube between the upper die 11 and the lower die 12 to press-form the steel tube into a V-shaped cross-sectional axle beam. However, this embodiment has the following features.

As shown in FIG. 3, in the press-forming process before the upper die 11 arrives at a bottom dead point position, both the upper plate 1a and the lower plate 1b have general bending deformation in which the curvature radii $R_1$ and $R_2$ become small. However, since the curvature radii $R_1$ and $R_2$ of the upper die 11 and the lower die 12 which form the bottom portion 2 of the V-shaped axle beam 1 are small as limited by Formula (2), the article to be formed is not adapted to the dies, and thereby undergoes excessive bending. As a result, a gap 3 is formed between the tip 11a of the upper die 11 and the corresponding portion of the upper plate 1a. Similarly, gaps 4 and 4 are also formed between both side portions of the bottom portion 12a of the lower die 12 and the corresponding portions of the lower plate 1b.

Press-forming proceeds with the gaps 3 and 4 before the upper die 11 arrives at a bottom dead point position. In this state, the V-groove surface 2c of the bottom portion 2a of the upper plate 1a and the V-groove surface 2d of the bottom portion 2b of the lower plate 1b are in a compressive stress state.

Additionally, as shown in FIG. 4, there is provided a die design in which a gap does not remain between the upper and lower dies 11 and 12 and the article to be formed as limited by Formula (1) when the upper die 11 has arrived at a bottom dead point position. Therefore, if forming is continued, deformation is applied which crushes the gap 3 between the tip Ha of the upper die 11 and the corresponding portion of the upper plate 1a and the gaps 4 and 4 between the side portions of the bottom portion 12a of the lower die 12 and the corresponding portions of the lower plate 1b. That is, in this case, the V-groove surfaces 2c and 2d of the bottom portion 2 are bent back to cause deformation in which the curvature radii $R_1$ and $R_2$ become large.

In this state, the bottom portion 2a of the upper plate 1a and the bottom portion 2b of the lower plate 1b are processed so as to be pushed wide by the dies, and eventually the V-groove surfaces 2c and 2d are brought into a tensile stress state. That is, the stress which makes the curvature radii $R_1$ and $R_2$ small is generated in both the V-groove surfaces 2c and 2d of the bottom portion 2.

Finally, as shown in FIG. 5, when the upper die 11 is raised and the article to be formed is released from the dies, the spring-back which makes the curvature radii $R_1$ and $R_2$ small occurs due to the reaction of the process of increasing the curvature radii $R_1$ and of the V-groove surfaces 2c and 2d of the bottom portion 2 when the upper die 11 arrives at a bottom dead point position. As a result, a compressive residual stress is imparted to the V-groove surfaces 2c and 2d of the bottom portion 2 of the axle beam by the spring-back after press-forming.

In the aforementioned embodiment, an axle beam has been shown as an example of a tubular part having a cross section of an irregular shape. However, it is natural that the present invention can also be widely applied to other underbody parts for a vehicle which require fatigue resistance, such as a suspension part around the axle beam. Additionally, the material of the steel tube is not limited at all, and can be any material. That is, if the press-forming method of the present invention is used, fatigue resistance can be improved for any kind of steel tube material.

As is clear from the above description, if the press-forming method of the present invention is used, a compressive residual stress can be imparted to a portion where the stress to be generated is high. Therefore, fatigue life can be significantly improved. In the conventional method, the fatigue life is short. Therefore, heat-treatment by quenching or the like is carried out after press-forming, thereby improving the fatigue life. In the present invention, the fatigue life can be improved even without heat treatment. Therefore, it is possible to achieve a reduction of the cost of heat treatment and a simplification of the processes. Furthermore, since heat treatment is not required, there is also an advantage that product precision can be secured.

EXAMPLE

Figure 6:
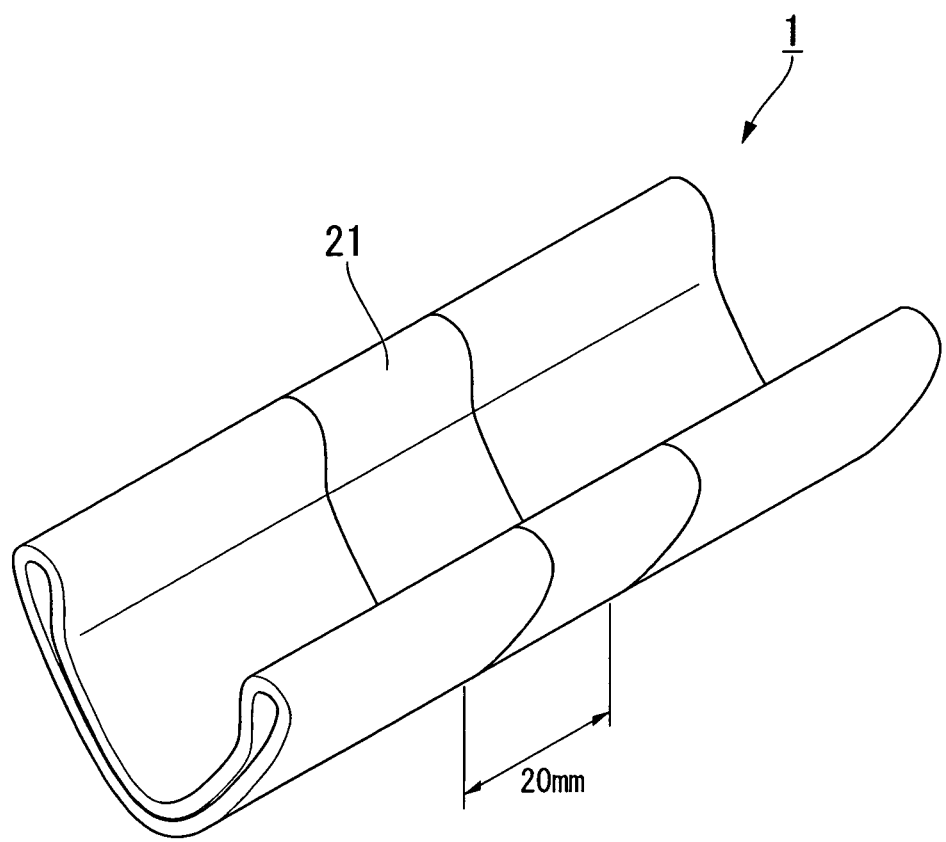
FIG. 6 is a perspective view of a fatigue-resistant evaluation test piece of a V groove portion in a V-shaped cross-sectional tubular part.

As shown in Table 1, the steel tube formed using the steel plate having a strength of 780-MPa class was press-formed under different conditions (i.e, t, $R_1$, and $R_2$), and a tubular part having a cross section of an irregular shape as shown in FIG. 6 was obtained. Numerical values which did not satisfy the conditions of the present invention are underlined in Comparative Example of Table 1. Additionally, the state of the residual stress of the V-groove surfaces 2c and 2d of the bottom portion 2 of the part after press-forming is shown in Table 1.

Figure 7:
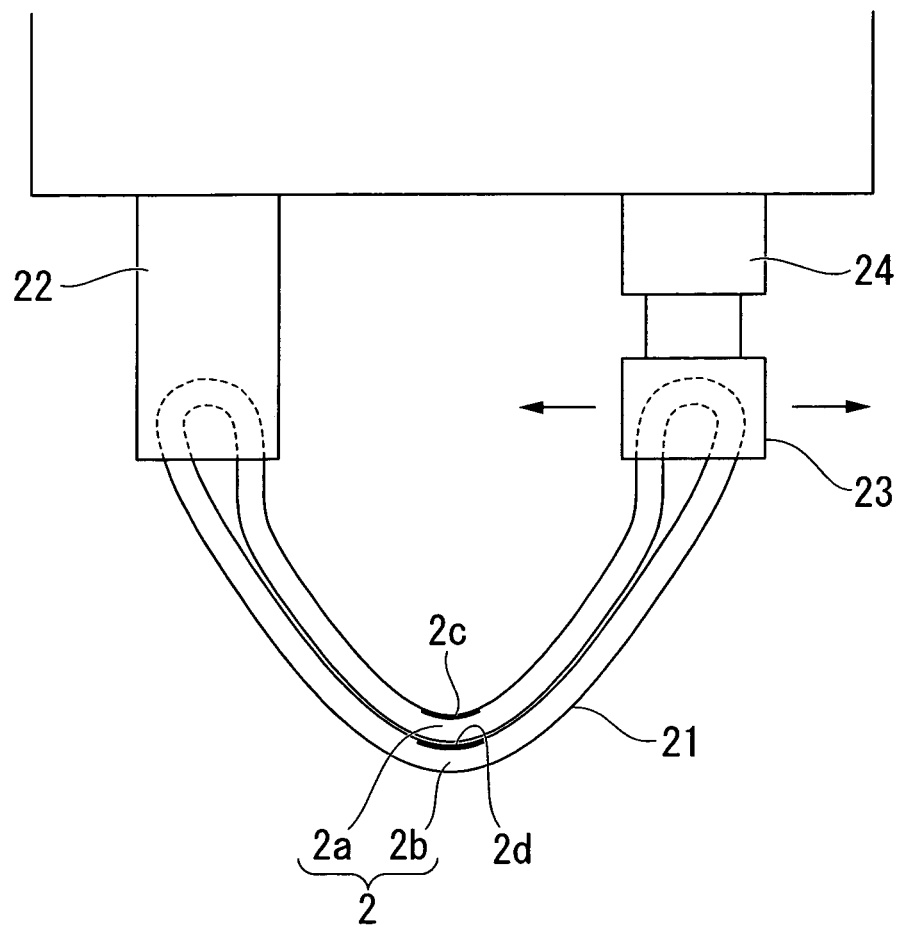
FIG. 7 is a drawing showing the test conditions of a fatigue-resistant evaluation test.

In order to evaluate the fatigue resistance of the bottom portion 2 of the tubular part, as shown in FIG. 6, a test piece 21 with a width of 20 mm was cut out from a longitudinal central portion of the tubular part having a cross section of a V-shape. When the test piece 21 was cut out, longitudinal residual stress was released. However, since circumferential constraint was maintained, the values of the residual stress of the V-groove surfaces 2c and 2d of the bottom portion 2 of the test piece was not substantially changed before and after cutting. As shown in FIG. 7, a fatigue test was performed by holding both ends of the cut-out V-shaped test piece by a fixed-side retainer 22 and a vibration-side retainer 23, and vibrating the vibration-side retainer 23 in a horizontal direction (a direction in which the V-shaped width increases or decreases) shown by the arrow of FIG. 7 at a frequency of 1 Hz by a vibrator 24 so that an alternate stress of ±500 MPa is applied to the test piece 21. The alternate stress cycles to occurrence of cracks caused by this fatigue test is shown in Table 1. Here, the alternate stress cycles to occurrence of fatigue cracks was evaluated in three ranks including rank (C) in which the fatigue life was less than 10,000 times, rank (B) in which the fatigue life is greater than or equal to 10,000 times and less than 100,000 times, and rank (A) having an excellent fatigue life of greater than or equal to 100,000 times.

Figure 8A:
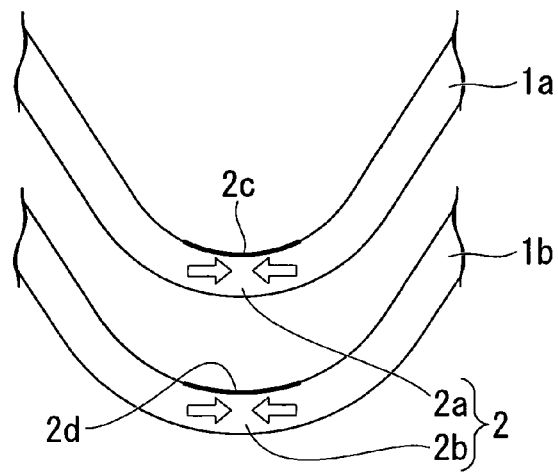
FIG. 8A is a drawing showing the residual stress of a test piece in Examples of the present invention.

As is clear from Examples 1 to 3, in the tubular part having a cross section of an irregular shape of the present invention, as shown in FIG. 8A, it was confirmed that sufficient compressive residual stress was imparted to the V-groove surfaces 2c and 2d of the bottom portion 2 and fatigue resistance was significantly improved.

As Comparative Example 1, a case where the curvature radius $R_1$ was smaller than that of Formula (2) is shown. In this case, since the curvature radius $R_1$ was too small, a crack was generated at the bottom portion 2 during forming, and forming could not be performed.

Figure 8B:
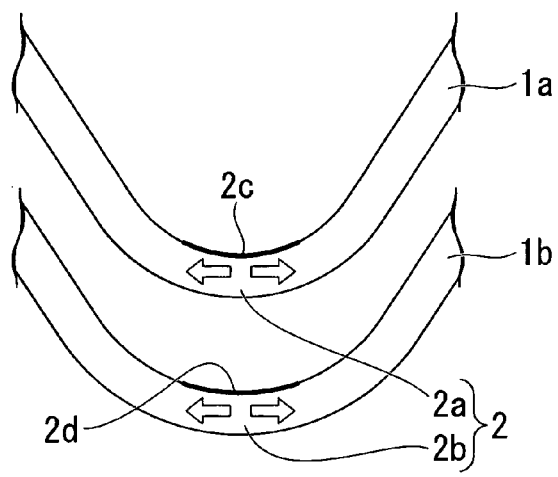
FIG. 8B is a drawing showing the residual stress of test pieces in Comparative Examples 2 to 4.
Figure 8C:
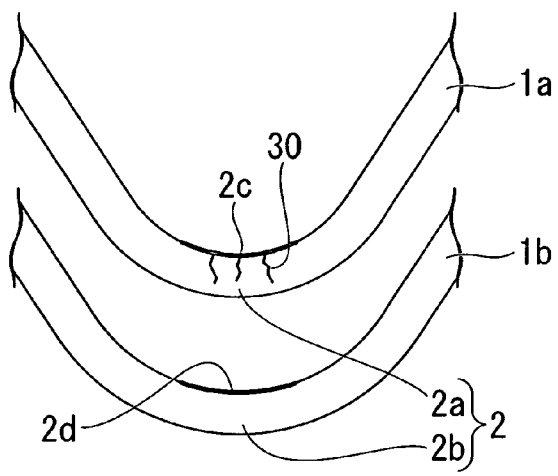
FIG. 8C is a drawing showing broken examples of test pieces in Comparative Examples 2 to 4.

As Comparative Example 2, a case where the curvature radius $R_1$ was larger than that of Formula (2) is shown. In this case, since the curvature radius $R_1$ was too large, the article to be formed was formed in close contact with the dies without any gap therebetween during the pressing process. Therefore, when the upper die 11 reached a bottom dead point position, the bottom portion 2 is not bent back, and thereby the V-groove surface 2c of the bottom portion 2a of the upper plate 1a was under compressive stress. Therefore, the subsequent spring-back caused tensile residual stress as shown in FIG. 8B in the V-groove surface 2c, and fatigue resistance was reduced. As a result, a crack 30 as shown in FIG. 8C was generated in the V-groove surface 2c of the bottom portion 2a of the upper plate 1a too quickly for practical use.

As Comparative Examples 3 and 4, a case where the curvature radius $R_2$ did not satisfy Formula (1) is shown. Since the curvature radius $R_2$ did not satisfy Formula (1), when the upper die 11 had arrived at a bottom dead point position, one or more gaps remained between the article to be formed and the dies. Therefore, the bottom portion 2 was not sufficiently bent back, and the V-groove surface 2c of the bottom portion 2a of the upper plate 1a was under compressive stress. Therefore, the subsequent spring-back caused tensile residual stress as shown in FIG. 8B in the V-groove surface 2c, and fatigue resistance was reduced. As a result, a crack 30 as shown in FIG. 8C was generated in the V-groove surface 2c of the bottom portion 2a of the upper plate 1a within an insufficiently short time for practical use.

As described above, in Comparative Examples in which the conditions of the present invention were not satisfied, a crack was generated during working of the bottom portion 2, or tensile residual stress was caused in the V-groove surface 2c of the bottom portion 2a of the upper plate 1a. Therefore, sufficient fatigue resistance could not be obtained.

It was proven from the above results that the tubular part having a cross section of an irregular shape manufactured by press-forming of a steel tube under conditions of the present invention had an excellent fatigue resistance since a sufficient compressive residual stress was imparted.

TABLE 1

| | t | $R_1$ | $R_2$ | Residual Stress of V-groove Surfaces | Alternate Stress Cycles to Occurrence of Fatigue Cracks | Description |
|---|---|---|---|---|---|---|
| Example 1 | 4 | 8 | 16 | Compression | A | Sufficient compressive stress was given, and fatigue resistance was improved. |
| Example 2 | 4 | 10 | 18 | Compression | A | Sufficient compressive stress was given, and fatigue resistance was improved. |
| Example 3 | 3 | 5 | 11 | Compression | A | Sufficient compressive stress was given, and fatigue resistance was improved. |
| Comparative Example 1 | 4 | 5 | 13 | Forming could not be performed. | | Since $R_1$ was too small, a crack was generated at the V-groove surface during forming, and forming could not be performed. |
| Comparative Example 2 | 4 | <u>15</u> | 23 | Tensile | C | Since $R_1$ was large, tensile residual stress was generated in the V-groove surface, and fatigue resistance was reduced. |
| Comparative Example 3 | 4 | 8 | <u>14</u> | Tensile | C | Since $R_2$ was small, tensile residual stress was generated in the V-groove surface, and fatigue resistance was reduced. |
| Comparative Example 4 | 4 | 8 | <u>18</u> | Tensile | C | Since $R_2$ was large, tensile residual stress was generated in the V-groove surface, and fatigue resistance was reduced. |

※Columns beyond the scope of this invention is underlined.
※In alternate stress cycles to occurrence of fatigue cracks, rank A was greater than or equal to 100,000 times, and rank C was less than 10,000 times.

While preferred embodiments of the present invention have been described and illustrated above, these are exemplary of the present invention and are not to be considered as limiting. Additions, omissions, substitutions, and other modifications can be made without departing from the scope of the present invention. Accordingly, the present invention is not to be considered as limited by the foregoing description and is only limited by the scope of the appended claims.

Industrial Applicability

A method of press-forming a tubular part having a cross section of an irregular shape used as an axle beam or the like, and a tubular part having a cross section of an irregular shape formed by this method can be provided.

[Brief Description of the Reference Symbols]
1 Axle beam
1a Upper plate
1b Lower plate
2 Bottom portion
2a Bottom portion of upper plate
2b Bottom portion of lower plate
2c V-groove surface of the bottom portion of upper plate
2d V-groove surface of the bottom portion of lower plate
3 Gap
4 Gap
11 Upper die
11a Tip of upper die
12 Lower die
12a Bottom portion of lower die
21 Test piece for fatigue test
22 Fixed-side retainer
23 Vibration-side retainer
24 Vibrator
30 Crack

What is claimed is:

1. A method of press-forming a tubular part having a cross section of an irregular shape which crushes a steel tube between an upper die and a lower die in order to form a V-shaped cross section, wherein when the curvature radius of a tip of the upper die is defined as $R_1$, the curvature radius of a bottom portion of the lower die corresponding to the tip of the upper die is defined as $R_2$, and the wall thickness of the steel tube is defined as t; $R_1$, $R_2$, and t satisfy $R_1+2t=R_2$ and $1.5t \leq R_1 \leq 3t$, the method comprising:

bending a V-groove surface in a bottom portion of an upper plate of the steel tube and a V-groove surface in a bottom portion of a lower plate of the steel tube under a compressive stress state by pressing the steel tube in a state where gaps are provided between the tip of the upper die and the steel tube and between the bottom portion of the lower die and the steel tube before the upper die arrives at a bottom dead point position thereof;

bending back the V-groove surface in the bottom portion of the upper plate of the steel tube and the V-groove surface in the bottom portion of the lower plate of the steel tube under a tensile stress state by pressing the steel tube in a state where the gaps are completely crushed when the upper die arrives at the bottom dead point position in order to form the tubular part having the cross section of the irregular shape; and imparting a compressive residual stress to a V-groove surface in a bottom portion of the tubular part having the cross section of the irregular shape by a spring-back which is caused in the tubular part having the cross section of the irregular shape after the upper die and the lower die are opened.

2. A tubular part having a cross section of an irregular shape formed a V-shaped cross section manufactured by the method of press-forming a tubular part having a cross section of an irregular shape according to claim 1, wherein the V-groove surface of the tubular part having a cross section of an irregular shape has the compressive residual stress formed by the spring-back.

3. The tubular part having a cross section of an irregular shape according to claim 2 being an underbody member used for a vehicle.

* * * * *

UNITED STATES PATENT AND TRADEMARK OFFICE
CERTIFICATE OF CORRECTION

PATENT NO. : 8,894,080 B2  
APPLICATION NO. : 12/736756  
DATED : November 25, 2014  
INVENTOR(S) : Takaaki Fukushi et al.

Page 1 of 1

It is certified that error appears in the above-identified patent and that said Letters Patent is hereby corrected as shown below:

In the Specification

Column 4, line 8, change "On the other hand, is required" to -- On the other hand, $1.5t \leq R_1$ is required --;

Column 4, lines 62-63, change "between the tip H a" to -- between the tip *11a* --.

Signed and Sealed this  
Fourth Day of August, 2015

Michelle K. Lee  
*Director of the United States Patent and Trademark Office*